(12) United States Patent
Tamura et al.

(10) Patent No.: US 6,602,163 B2
(45) Date of Patent: Aug. 5, 2003

(54) SHIFT CONTROL APPARATUS AND SHIFT CONTROL OF CONTINUOUSLY VARIABLE TRANSMISSION

(75) Inventors: Tadashi Tamura, Toyota (JP); Hideki Yasue, Toyota (JP); Katsumi Kono, Toyota (JP); Daisuke Inoue, Toyota (JP); Yoshiaki Yamamoto, Toyota (JP); Hiroki Kondo, Toyota (JP); Hiroji Taniguchi, Toyota (JP); Kenji Matsuo, Toyota (JP); Yuji Hattori, Bisai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/854,605

(22) Filed: May 15, 2001

(65) Prior Publication Data

US 2001/0046924 A1 Nov. 29, 2001

(30) Foreign Application Priority Data

May 23, 2000 (JP) ........................ 2000-151896

(51) Int. Cl.⁷ ..................... F16H 59/64; B60K 41/12
(52) U.S. Cl. ............................. 477/98; 477/37
(58) Field of Search ........................ 477/37, 44, 98, 477/107, 902

(56) References Cited

U.S. PATENT DOCUMENTS

| | | | | |
|---|---|---|---|---|
| 4,713,987 A | * | 12/1987 | Matsumura | 477/98 X |
| 4,807,495 A | * | 2/1989 | Wallace | 477/98 |
| 5,199,326 A | * | 4/1993 | Iwatsuki et al. | 477/98 |
| 5,601,511 A | * | 2/1997 | Michioka | 477/98 |
| 5,713,815 A | * | 2/1998 | Funatsu et al. | 477/98 X |
| 5,803,863 A | * | 9/1998 | Hayward et al. | 477/98 |
| 5,807,206 A | * | 9/1998 | Okazaki | 477/98 |
| 5,876,301 A | * | 3/1999 | Tabata et al. | 477/98 X |
| 5,984,829 A | * | 11/1999 | Minagawa et al. | 477/98 |
| 6,095,946 A | * | 8/2000 | Maguire et al. | 477/98 |
| 6,142,908 A | * | 11/2000 | Kidokoro et al. | 477/38 |
| 6,345,226 B1 | * | 2/2002 | Koga et al. | 477/37 X |

FOREIGN PATENT DOCUMENTS

| | | | |
|---|---|---|---|
| DE | 195 27 412 | 1/1997 | |
| DE | 197 06 746 | 11/1997 | |
| JP | 362286847 A | 12/1987 | ............ 477/98 |
| JP | 03-103654 | 4/1991 | |
| JP | 09-217824 | 8/1997 | |
| JP | 11-51162 | 2/1999 | |

\* cited by examiner

*Primary Examiner*—Charles A Marmor
*Assistant Examiner*—Roger Pang
(74) *Attorney, Agent, or Firm*—Oblon, Spivak, McClelland, Maier & Neustadt, P.C.

(57) ABSTRACT

When the temperature of operating fluid of an actuator is low, a target input rotation speed lower limit value (NinL) is set. The lower limit value (NinL) is greater than a lower limit value set for a normal temperature of operating fluid. A target input rotation speed (Nint) is calculated from the state of running of a vehicle, such as the amount of operation of an accelerator, the vehicle speed, etc. If the target input rotation speed is lower than the lower limit value (NinL), the target input rotation speed is reset to the lower limit value (NinL). As a result of a control that includes the above-described steps, the speed ratio $\gamma$ becomes relatively high before the vehicle stops. Therefore, even if the speed ratio-changing rate is low, the speed ratio ($\gamma$) can be brought to or near a maximum value ($\gamma max$) before the vehicle stops. Thus, reductions in the speed ratio-changing rate caused by low temperature of the operating fluid of the actuator can be curbed.

13 Claims, 7 Drawing Sheets

SHIFT CONTROL APPARATUS AND SHIFT CONTROL OF CONTINUOUSLY VARIABLE TRANSMISSION

INCORPORATION BY REFERENCE

The disclosure of Japanese Patent Application No. 2000-151896 filed on May 23, 2000 including the specification, drawings and abstract is incorporated herein by reference in its entirety.

BACKGROUND OF THE INVENTION

1. Field of the Invention

The present invention relates to a continuously variable transmission that performs speed shift by using a hydropneumatic actuator and, more particularly, to a shift control apparatus and a shift control method for controlling the speed ratio.

2. Description of the Background

A continuously variable transmission is known in which a transfer member is provided between a rotatable input member and a rotatable output member in such a fashion that the transfer member contacts the input and output members, and in which a speed shift operation is performed by changing the positions of contact of the transfer member with the input member and the output member.

An example of such a continuously variable transmission is disclosed in Japanese Patent Application Laid-Open No. HEI 3-103654. In the apparatus described in the patent application, each of the input and output pulleys is made up of a stationary sheave and a movable sheave that have a generally cone or frustum shape. The stationary and movable sheaves are disposed so that peripheral surfaces thereof having a conical shape or the like face each other. A belt is sandwiched between the peripheral surfaces of the sheaves. By changing the interval between the sheaves of each pulley, the position at which the belt passes on the pulley, that is, the belt engagement radius on the pulley, can be varied. By changing the sheave interval of the input-side pulley, the belt passing position is controlled so as to control the ratio between the rotation speed of the input pulley and the rotation speed of the output pulley, that is, the speed ratio. The sheave interval is changed by moving the movable sheave through the use of a hydropneumatic actuator.

The operating fluid used for the hydropneumatic actuator in most cases is a liquid and, more particularly, a polymeric hydrocarbon generally termed "oil." This operating fluid greatly changes in viscosity depending on temperature. When the temperature decreases, the viscosity of the operating fluid increases. If the viscosity increases, the flow passage resistance of the operating fluid increases, so that the amount of the operating fluid supplied to or discharged from the actuator decreases. This reduces the stroke speed of the actuator, giving rise to the problem that a predetermined value of the changing rate of the speed ratio (hereinafter, referred to as "speed ratio-changing rate") cannot be achieved, therefore degrading the speed shift responsiveness.

SUMMARY OF THE INVENTION

The invention has as an object to solve the aforementioned problem.

It is another object of the invention to perform an appropriate shift control when an operating fluid of a hydropneumatic actuator used in a continuously variable transmission has a low temperature.

In order to address the aforementioned and other objects, a continuously variable transmission shift control apparatus in accordance with a first mode of the invention sets a target input rotation speed within a second setting range that is narrower than a first setting range of the target input rotation speed provided for use for a normal temperature of the operating fluid, if the temperature of the operating fluid is lower than the normal temperature. That is, when the operating fluid temperature drops to such an extent as to affect the speed ratio-changing rate, the range of change of the target input rotation speed is limited to a range that is narrower than the range of change set for the normal temperature.

Therefore, even if the speed shift responsiveness deteriorates due to low operating fluid temperature, deviation of the actual rotation speed of the input member, that is, the actual input rotation speed, from an allowable rotation speed, or a situation in which a required input rotation speed cannot be achieved, can be avoided.

The second setting range may be set narrower if the temperature of the operating fluid is lower. Since the setting range of the target input rotation speed can be narrowed in accordance with the extent of decrease of the speed ratio-changing rate, it becomes possible to reliably avoid deviations of the actual input rotation speed from the allowable rotation speed, or to prevent a situation in which a required input rotation speed cannot be achieved.

Furthermore, when the temperature of the operating fluid is less than the normal temperature, a high rotation speed-side value of the target input rotation speed may be set to a value that is lower than a high rotation speed-side value set when the temperature of the operating fluid is a normal temperature. In addition, a low rotation speed-side value of the target input rotation speed, when the temperature of the operating fluid is less than the normal temperature, may be set to a value that is higher than a low rotation speed-side value set when the temperature of the operating fluid is at a normal temperature. This manner of setting the target input rotation speed makes it possible to avoid a deviation of the input rotation speed from the allowable rotation speed.

Still further, the high rotation speed-side value of the target input rotation speed calculated based on the state of running of the vehicle may be restricted via an upper limit value, or the low rotation speed-side value of the target input rotation speed may be restricted via a lower limit value. Thus, adoption of a construction in which the high rotation speed-side value of the target input rotation speed is set lower when the operating fluid temperature is lower than normal temperature than when the operating fluid temperature is normal temperature, and a construction in which the low rotation speed-side value of the target input rotation speed is set higher when the operating fluid temperature is lower than normal temperature than when the operating fluid temperature is normal temperature, makes it possible to set a suitable low rotation speed-side value or a suitable high rotation speed-side value of the target input rotation speed by suitably changing the upper limit value or the lower limit value.

Furthermore, if the continuously variable transmission is provided with a manual shift mode that allows an operator to select a transmission speed from a plurality of pre-set transmission speeds that are fixed speed ratios or have predetermined widths of speed ratios, the controller may be constructed so that if the manual shift mode is selected and the temperature of the operating fluid is less than normal temperature, the controller sets the high rotation speed-side value of the target input rotation speed alone to a value that is lower than the high rotation speed-side value set when the temperature of the operating fluid is a normal temperature. This construction makes it possible to avoid deviation of the revolution speed of a primary motor from an allowable revolution speed even when the manual shift mode is selected. Furthermore, since the range of change of the target input rotation speed is restricted only on the high rotation speed side of the target input rotation speed, an upshift request from an operator can be met.

In another embodiment, the setting range of the target input rotation speed may be changed based on the viscosity of the operating fluid instead of the temperature of the operating fluid. Modes of the invention are not limited to the above-described continuously variable transmission shift control apparatus. Other modes of the invention are, for example, a vehicle equipped with a continuously variable transmission, or a shift control method for performing a speed shift operation in the vehicle.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENT

A preferred embodiment of the invention will be described hereinafter with reference to the accompanying drawings. This embodiment is a continuously variable transmission that is formed as a portion of a drive power transfer apparatus of a vehicle drive apparatus.

Figure 1:
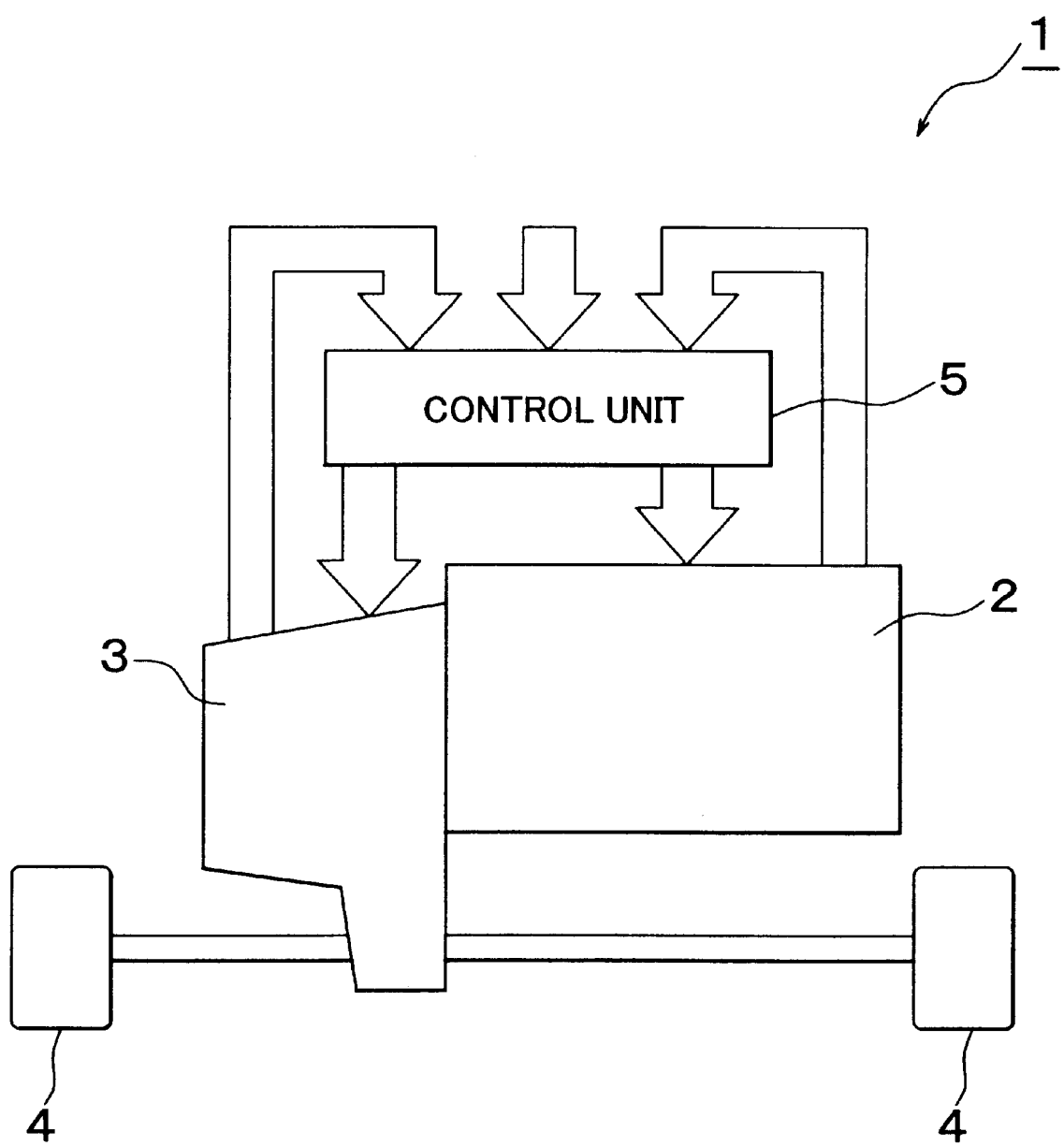
FIG. 1 is a diagram schematically illustrating a construction of a vehicle drive apparatus that includes a continuously variable transmission in accordance with an embodiment of the invention.

FIG. 1 is a diagram schematically illustrating a construction of a vehicle drive apparatus 1. Output of an engine 2 as a driving motor is transferred to drive wheels 4 via a drive power transfer apparatus 3, thereby driving the vehicle. A control unit 5 for controlling the vehicle drive apparatus 1 calculates predetermined control parameters regarding the engine 2 and the drive power transfer apparatus 3 from parameters that represent the state of running of the vehicle, such as a state of operation of the engine 2, a state of operation of the drive power transfer apparatus 3, etc. The control parameters are, for example, the degree of opening of a throttle valve, the amount of fuel injected, the speed ratio, etc. By controlling these parameters, the engine 2 and the drive power transfer apparatus 3 are controlled to predetermined states.

Figure 2:
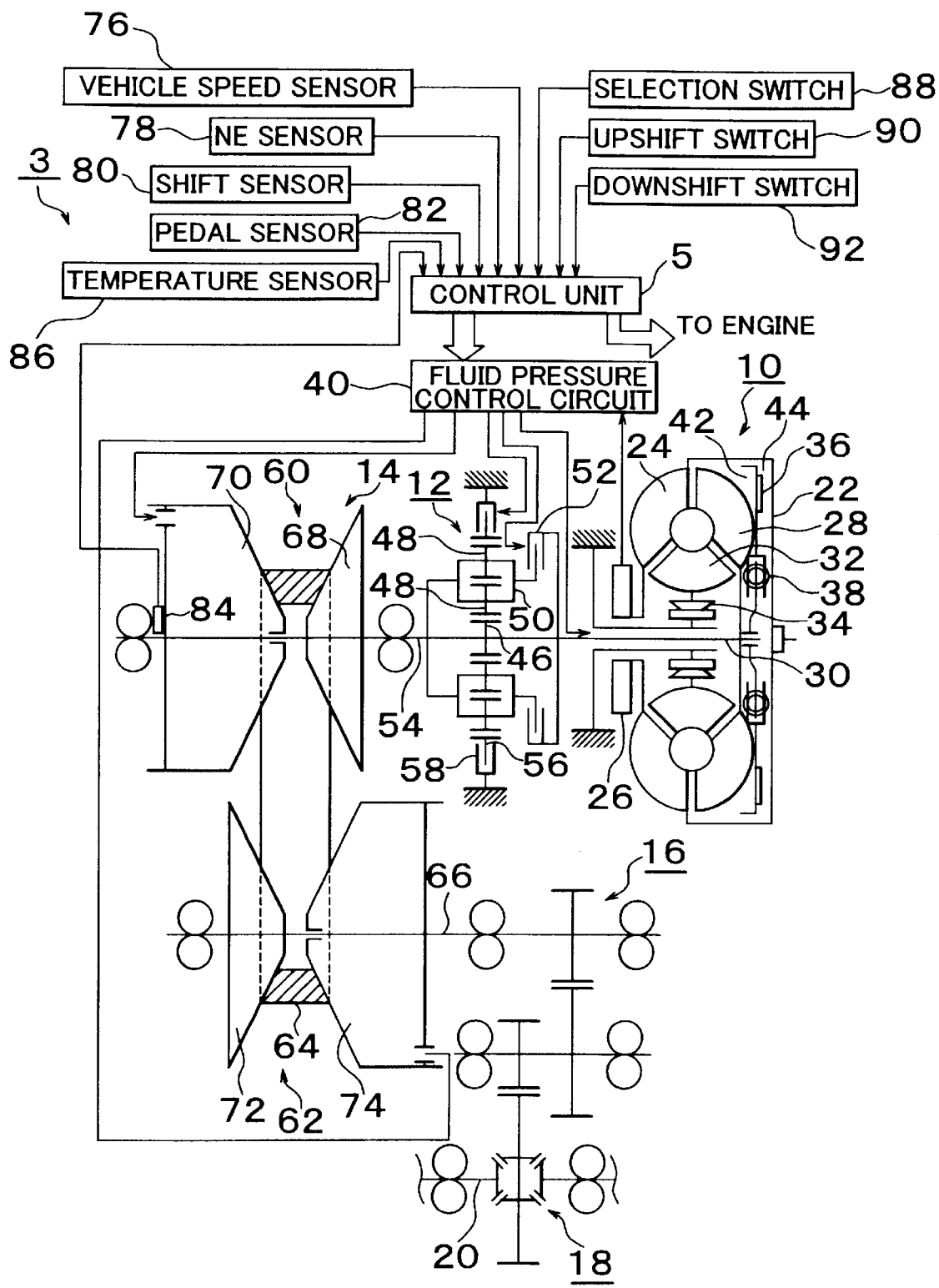
FIG. 2 is a diagram schematically illustrating a construction of a power transfer apparatus that includes the continuously variable transmission of the embodiment.

FIG. 2 is a schematic diagram illustrating a construction of the drive power transfer apparatus 3 including a CVT (continuously variable transmission). Output of the engine 2 is transferred to a drive shaft 20 via a torque converter 10 provided as a fluidic transfer mechanism, a forward-reverse switching mechanism 12, a CVT 14, a speed reducer mechanism 16, and a differential device 18, thereby driving the vehicle.

A front cover 22 of the torque converter 10 is rotated by power from the engine 2. Rotation of the front cover 22 is transferred to a pump impeller 24 and an oil pump 26. The oil pump 26 supplies operating fluid to hydraulic control mechanisms in various portions of the drive power transfer apparatus 3. The operating fluid also functions as a lubricating oil. The pump impeller 24 delivers operating fluid filling the torque converter 10 toward a turbine runner 28. In response, the turbine runner 28 rotates. The turbine runner 28 is coupled to a torque converter output shaft 30 so as to rotate together with the torque converter output shaft 30. Therefore, rotation of the turbine runner 28 becomes the output of the torque converter 10. Operating fluid passing through the turbine runner 28 passes through a stator runner 32, and then reaches the pump impeller 24. The stator runner 32 is supported via a one-way clutch 34. In a region where the input-output speed ratio of the torque converter 10 is relatively low (a region at or below a clutch point), the one-way clutch 34 becomes engaged so that the stator runner 32 is fixed. When in this state, the stator runner 32 changes the direction of operating fluid delivered from the turbine runner 28, and feeds operating fluid toward the pump impeller 24 from rearward in the rotating direction of the pump impeller 24. In this manner, torque is amplified. When the speed ratio of the torque converter 10 exceeds the clutch point, operating fluid delivered from the turbine runner 28 flows in such a manner that the operating fluid strikes a back of the stator runner 32. Therefore, the one-way clutch 34 becomes disengaged, so that the stator runner 32 idles. In this situation, the torque converter 10 does not perform torque amplification, but functions as a fluid coupling.

The torque converter 10 has a lockup function. A lockup clutch plate 36 is disposed facing the front cover 22. The lockup clutch plate 36 is supported to the torque converter output shaft 30 so that the lockup clutch plate 36 rotates together with the torque converter output shaft 30 and is slidable relative to the torque converter output shaft 30 in the direction of an axis thereof. A torsion damper 38 for absorbing impacts and vibrations in twisting directions is disposed between an outer peripheral portion of the lockup clutch plate 36 that contacts the front cover 22 and a central portion thereof at which the lockup clutch plate 36 is supported by the torque converter output shaft 30. During a locked-up state, operating fluid is supplied toward a back face side 42 of the lockup clutch plate 36 from a fluid pressure control circuit 40 that is controlled by the control unit 5. Due to this pressure, the lockup clutch plate 36 slides in a rightward direction in the drawing, and engages with the front cover 22. Thus, power is transferred without the intervention of operating fluid. To discontinue the locked-up state, operating fluid is supplied to a forward face side 44 of the lockup clutch plate 36. Due to the supplied fluid pressure, the lockup clutch plate 36 slides leftward in the drawing, and thus becomes disengaged from the front cover 22.

The forward-reverse switching mechanism 12 is formed as a generally termed double-planetary type planetary gear train that has two rows of planetary gears. A sun gear 46 is coupled to the torque converter output shaft 30. Two rows of planetary gears 48 are rotatably connected to a common carrier 50. The carrier 50 is coupled to the torque converter output shaft 30. The carrier 50 is also coupled to an input shaft 54 of the CVT 14. A reverse-drive brake 58 is provided for engagement with a ring gear 56.

For forward drive, a forward-drive clutch 52 is engaged due to supply of operating fluid from the fluid pressure control circuit 40 so that the torque converter output shaft 30 and the input shaft 54 are locked up. For reverse drive, the forward-drive clutch 52 is controlled to a disengaged state, and furthermore the reverse-drive brake 58 is controlled to an engaged state due to supply of operating fluid from the fluid pressure control circuit 40. As a result, the carrier 50 and the torque converter output shaft 30 rotate in directions opposite to each other. That is, the rotating direction is reversed by the forward-reverse switching mechanism 12.

Furthermore, the drive power transfer apparatus 3 is set to a neutral state by disengaging both the forward-drive clutch 52 and the reverse-drive brake 58.

The CVT 14 has an input-side pulley 60 rotatable together with the CVT input shaft 54, an output-side pulley 62, and a belt 64 disposed around the pulleys 60, 62. The output-side pulley 62 rotates a CVT output shaft 66, and thereby delivers power to the speed reducer mechanism 16.

The input-side pulley 60 further has a stationary sheave 68 and a movable sheave 70. The sheaves 68, 70 are juxtaposed in the direction of the CVT input shaft 54. Surfaces of the sheaves facing each other are formed similarly to the peripheral surface of a cone or a frustum. The movable sheave 70 is rotatable together with the input shaft 54, and also functions as a hydropneumatic actuator. The movable sheave 70 is movable in the directions of the axis thereof through an operating fluid supply amount control performed by the fluid pressure control circuit 40. In accordance with movement of the movable sheave 70, the interval between the surfaces of the two sheaves 68, 70 facing each other and formed similarly to the peripheral surface of a cone or the like is changed. As in the case of input-side pulley 60, the output-side pulley 62 has a stationary sheave 72 and a movable sheave 74. Surfaces of the sheaves that face each other are generally similar to the peripheral surface of a cone or the like. The movable sheave 74 is movable in the direction of the axis by controlling the amount of operating fluid supplied, whereby the interval between the two sheaves 72, 74 is changed.

The belt 64 has a generally trapezoidal sectional shape that fits the shapes of the inward surfaces of the stationary sheaves 68, 72 and the movable sheaves 70, 74 of the input-side and output-side pulleys 60, 62. The belt 64 is retained in a sandwiched manner by the stationary sheaves 68, 72 and the movable sheaves 70, 74. By changing the intervals between the stationary sheaves 68, 72 and the movable sheaves 70, 74, the rotating radii of belt 64-engaged positions are changed. Furthermore, changes in the rotating radii of the belt 64—engaged positions on the input and output sides change the speed ratio between the input and output shafts 56, 66 of the CVT. Since the position of each one of the sheaves 70, 74 can be arbitrarily and continuously determined, the speed ratio of the CVT 14 assumes a continuously variable value within a predetermined range.

As shown in FIG. 2, in order to control the vehicle drive apparatus 1, the control unit 5 receives inputs of signals from various sensors, such as a vehicle speed sensor 76 for detecting the speed of the vehicle, an NE sensor 78 for detecting the revolution speed of the engine 2, a shift sensor 80 for detecting the shift position selected by a shift lever, a pedal sensor 82 for detecting the amount of operation of an accelerator pedal, a rotation speed sensor 84 for detecting the rotation speed of the CVT input shaft 54, a temperature sensor 86 for detecting the temperature of the operating fluid, etc.

In this embodiment, an automatic shift mode and a manual shift mode are provided as speed shift modes of the CVT 14. Either one of these shift modes can be selected by a driver operating a selection switch 88 that is provided on a steering wheel or an instrument panel.

The manual shift mode is a mode in which a driver selects a transmission speed to drive the vehicle as in a manual transmission-equipped vehicle. That is, the manual shift mode is a mode in which a transmission speed is selected from a plurality of pre-set transmission speeds that are fixed speed ratios or have predetermined widths of speed ratios, for example the first to fifth speeds. The steering wheel or the shift lever is provided with an upshift switch 90 and a downshift switch 92 that allow a driver to select a transmission speed.

Therefore, signals from the selection switch 88, the upshift switch 90 and the downshift switch 92 are also inputted to the control unit 5. Based on the values outputted from the sensors and the switches, the control unit 5 controls the CVT 14.

Figure 3:
FIG. 3 is a diagram showing a shift indicator.

The shift position and the transmission speed selected during the manual shift mode are indicated in a shift indicator. FIG. 3 shows an example of an indication by the shift indicator. In FIG. 3, lamps "P", "R" and "N" correspond to the parking range, the reverse range and the neutral range as in conventional automatic transmission-equipped vehicles. Each lamp is turned on to indicate that the corresponding range is currently selected. Provided on the left end is a seven-segment or dot-matrix indicator in which the displayed content can be changed. For example, if "D" is displayed, the displayed content indicates that the current selection is the automatic shift mode, which is similar to the D range in a conventional automatic transmission-equipped vehicle. If the manual shift mode is selected, the left-end indicator displays one of numerals "1" to "5". The displayed numeral indicates the transmission speed that is currently set.

The drive power required for the vehicle increases with increases in the amount of operation of the accelerator, and decreases with increases in the vehicle speed. Therefore, if the automatic shift mode is selected, the control unit 5 calculates a target input rotation speed of the CVT 14 based on the state of running of the vehicle, such as the amount of operation of the accelerator, the vehicle speed, etc., and controls the speed ratio of the CVT 14 so that the rotation speed of the CVT input shaft 54, that is, the input rotation speed thereof, becomes equal to the target input rotation speed, in order to produce an engine output that is needed to achieve a required drive power.

If the manual shift mode is selected, the control unit 5, based on the selected transmission speed, calculates a target input rotation speed for achieving a speed ratio corresponding to the selected transmission speed, and then controls the speed ratio of the CVT 14 so that the input rotation speed becomes equal to the target input rotation speed.

The rotation speed of the CVT input shaft 54 simply corresponds to the rotation speed of the differential device 18, and therefore corresponds to the output of the vehicle speed sensor 76. Hence, it is possible to determine a target value of the input shaft rotation speed corresponding to the vehicle speed, and to control the input-output speed ratio by controlling the hydropneumatic actuator, that is, controlling the interval between the movable and stationary sheaves, so as to achieve the target value of the input shaft rotation speed.

Figure 4:
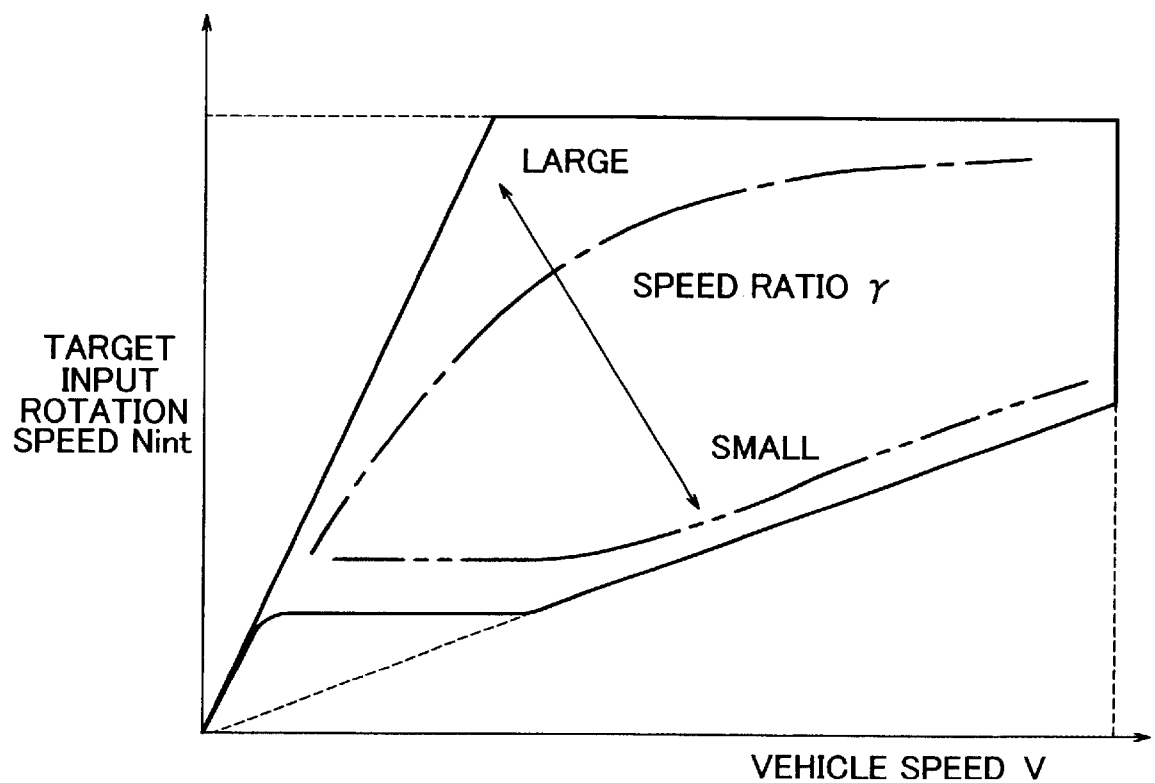
FIG. 4 is a diagram indicating a control map of the continuously variable transmission.

FIG. 4 indicates a range of the target input rotation speed that is possible with the CVT 14. In the diagram of FIG. 4, the horizontal axis represents the vehicle speed V, and the vertical axis represents the target input rotation speed Nint. The speed ratio γ (=input shaft rotation speed/output shaft rotation speed) increases in a direction toward an upper left region in the diagram, and decreases in a direction toward a lower right region. The maximum value γmax and the minimum value γmin of the speed ratio γ are determined by mechanical restrictions on the positions of engagement of the belt 64 on the input and output-side pulleys 60, 62. Of the straight lines passing through the origin in FIG. 4, the more sloped straight line indicates the maximum value γmax, and the less sloped straight line indicates the minimum value γmin. Solid lines in FIG. 4 and a region defined by the solid lines indicate a selectable range of the target input rotation speed.

In general, if the speed ratio control is executed in the vicinity of the boundary of the aforementioned speed shift range when the temperature of operating fluid is low and the viscosity thereof is high, the speed ratio-changing rate may decrease and the speed shift responsiveness may deteriorate, so that in some cases the input rotation speed may deviate from the allowable rotation speed. In some other cases, a speed shift operation cannot be completed within a predetermined time. In this embodiment, therefore, the problem of reductions in the speed ratio-changing rate due to temperature decreases of the operating fluid is countered by reducing the range of change of the target input rotation speed as indicated by a one-dot chain line and a two-dot chain line in FIG. 4.

Reduced speed ratio-changing rates cause, for example, problems as follows. That is, the CVT 14 cannot perform a speed shift operation unless the input and output-side pulleys 60, 62 and the belt 64 are turning. That is, the speed shift operation cannot be performed while the vehicle is at a stop. When the vehicle is started, a great drive wheel torque is needed, so that the speed ratio γ needs to be equal to or close to the maximum value γmax. However, since the shift operation is not possible during a stop of the vehicle as mentioned above, it is required that a high speed ratio γ be set before the vehicle stops. When the accelerator pedal is released and the vehicle slows down and is expected to stop, the control unit 5 increases the speed ratio γ by setting the target input rotation speed to a lower limit value and controlling the speed shift of the CVT 14 so that the input rotation speed becomes equal to the lower limit value. If the temperature of the operating fluid of the actuator is within a temperature range (normal temperature) considered during the design phase, the speed ratio γ can be increased to the maximum value γmax before the vehicle decelerates and stops.

However, if the operating fluid temperature is lower than the normal range, there is possibility that the speed ratio-changing rate will slow down so that the speed ratio γ cannot be brought to or near the maximum value γmax before the vehicle stops. If the vehicle stops before the speed ratio γ is brought to or near the maximum value γmax, the vehicle must be driven, at the next start, with a speed ratio γ lower than an appropriate value, and therefore the starting performance deteriorates. This situation is comparable to a situation in which a normal manual transmission-equipped vehicle starts in the second or third speed.

Taking the aforementioned problem into account, this embodiment is devised so that when the temperature of the operating fluid of the hydropneumatic actuator is low, the lower limit value of the target input rotation speed Nint of the CVT 14 is set lower than the lower limit value set when the operating fluid temperature is within the normal range. As a result, the width of shift to the maximum value γmax, that is, the amount of movement of the movable sheaves, during a period preceding a stop of the vehicle, is reduced. Therefore, the speed ratio γ can be brought to or near the maximum value γmax within a predetermined time before the vehicle decelerates and stops, even if the speed ratio-changing rate is low.

Figure 5:
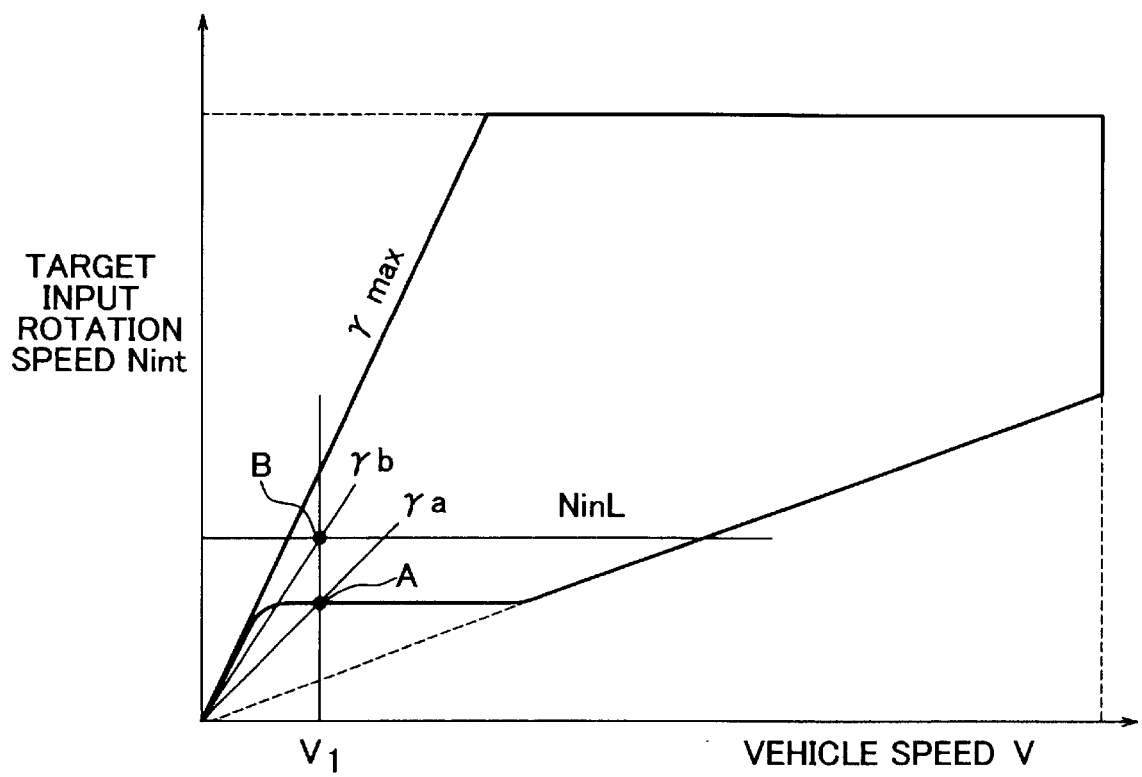
FIG. 5 is a diagram for illustrating a control performed when the temperature of operating fluid of the continuously variable transmission is low.

FIG. 5 is a diagram for illustrating the effects provided by changing the lower limit of the target input rotation speed Nint to a higher rotation speed side. In FIG. 5, solid lines indicate a range of change of the target input rotation speed allowed at a normal operating fluid temperature as described above in conjunction with FIG. 4. A one-dot chain line indicates an input rotation speed lower limit NinL that is used when the operating fluid temperature is low. If the operating fluid temperature is within the normal range, the speed ratio γ at a vehicle speed V1 equals γa. When the vehicle is to stop, the shift control is performed to change the speed ratio γ from γa to the maximum value γmax. If the operating fluid temperature is low, a control is performed such that the target input rotation speed remains above NinL, and the speed ratio γ at the vehicle speed V1 is γb that is greater than the aforementioned value γa. The value γb is less deviated from the maximum value γmax, so that even if the speed ratio-changing rate is slow, the shift operation to the maximum value γmax can be completed before the vehicle stops.

It is preferable that the target input rotation speed lower limit value NinL set when temperature is low be changed to a higher rotation speed side if the operating fluid temperature is lower. The width of change of the lower limit value NinL to a higher rotation speed side may be changed in accordance with the vehicle speed. For example, the width of change may be increased for higher vehicle speeds. If the lower limit value NinL is changed to a higher rotation speed side for lower operating fluid temperatures, the speed ratio γ can be more reliably changed to the maximum value γmax or to the vicinity thereof when the vehicle is about to stop.

Figure 6:
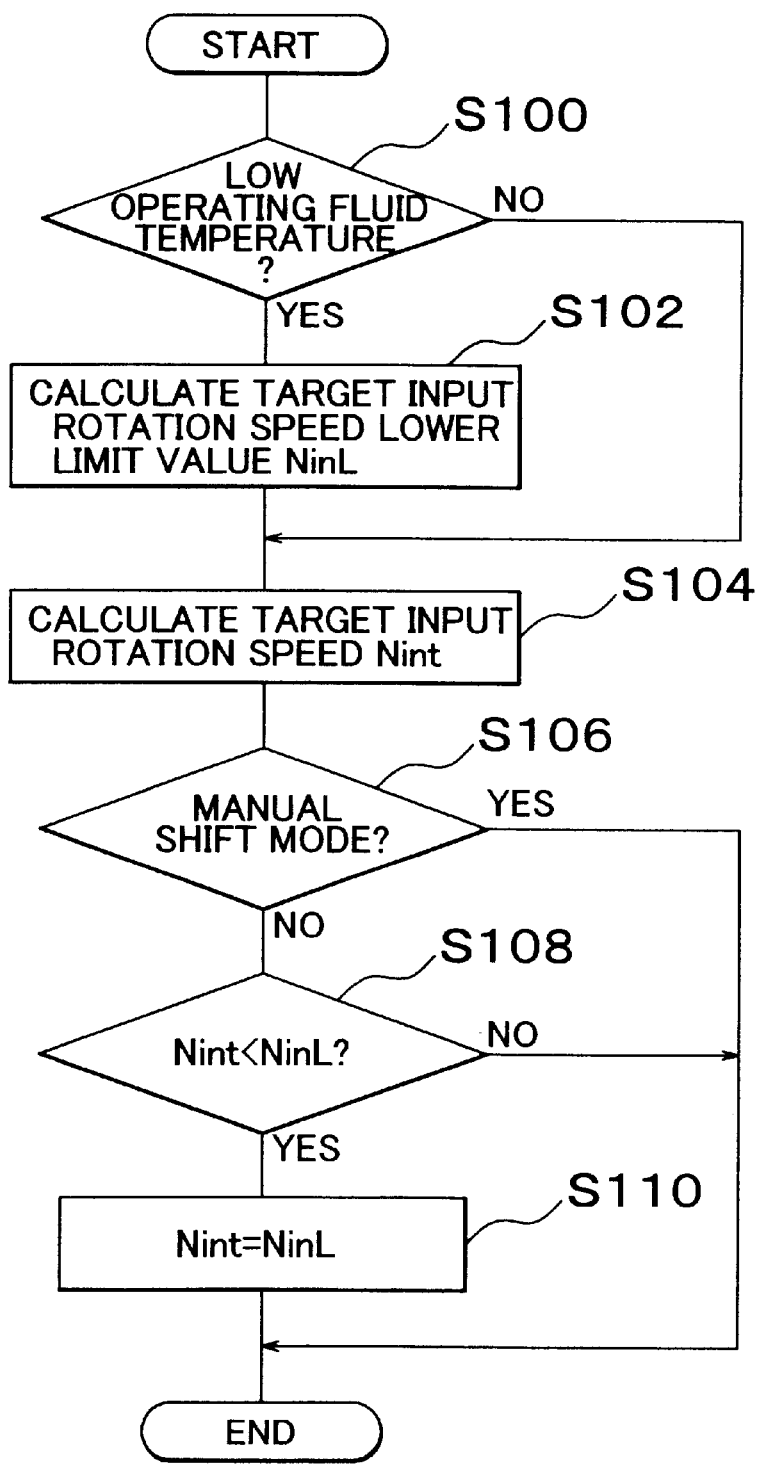
FIG. 6 is a flowchart regarding a control performed when the operating fluid temperature is low.

FIG. 6 is a flowchart regarding a control performed when the operating fluid temperature is low. The operating fluid temperature is detected based on the output of the temperature sensor 86, and it is determined whether the detected temperature is a low temperature that is below the normal temperature range (S100). If it is determined that the operating fluid temperature is a low temperature, a target input rotation speed lower limit value NinL corresponding to the low temperature state is calculated (S102). If the operating fluid temperature is within the normal range, step S102 is skipped. After that, a target input rotation speed Nint is calculated from the current state of running of the vehicle, for example, the speed shift mode, the amount of accelerator operation, the vehicle speed, etc. (S104). Subsequently, it is determined whether the manual shift mode is currently selected (S106).

If the currently selected mode is the automatic shift mode, the target input rotation speed Nint is compared with the lower limit value NinL (S108). If the target input rotation speed Nint is less than the lower limit value NinL, the target input rotation speed Nint is reset to the lower limit value NinL (S110). Conversely, if it is determined in s106 that the manual shift mode is currently selected, or if it is determined in S108 that the target input rotation speed Nint is equal to or greater than the lower limit value NinL, the control is performed based on the target input rotation speed Nint calculated in step S104.

As described above, the provision of a lower limit value for the target input rotation speed at the time of a low operating fluid temperature is intended to prevent the speed ratio γ from becoming a small value. This means, in the manual shift mode, that the setting of a relatively high transmission speed is prevented. Therefore, a case may occur in which when a driver requests an upshift after selecting the manual shift mode, but a fourth or higher speed cannot be set despite the driver's request. In this embodiment, in order to respect the driver's upshift request, the restriction on the target input rotation speed Nint by the lower limit value NinL is avoided when the manual shift mode is selected.

Another example of the problems caused by a reduction in the speed ratio-changing rate will be described below. If a driver requests full acceleration by depressing the accelerator pedal to its stroke limit, the speed ratio γ is controlled in accordance with a curve W shown in FIG. 7. The actual input rotation speed accords with the curve W as long as the operating fluid temperature is within the normal range and there is no substantial difference between the target input rotation speed and the actual input rotation speed. However, if the operating fluid temperature is low and the speed ratio-changing rate is low, the actual input rotation speed exhibits a delay as indicated by a broken line in FIG. 7, despite the target input rotation speed being on the curve W. That is, the changing of the speed ratio γ cannot precisely proceed in accordance with increases in the input rotation speed, resulting in additional increases in the input rotation speed. The rotation speed of the CVT input shaft 54 is related to the rotation speed of the output shaft of the engine 2. Therefore, if the input rotation speed deviates from the allowable rotation speed as indicated by a point C in FIG. 7, the engine revolution speed also deviates from the allowable revolution speed. In this event, an overspeed prevention control, such as a fuel supply shutoff or the like, is performed at the engine. This control is abrupt and causes a certain shock to an occupant, thereby discomforting the occupant.

Figure 7:
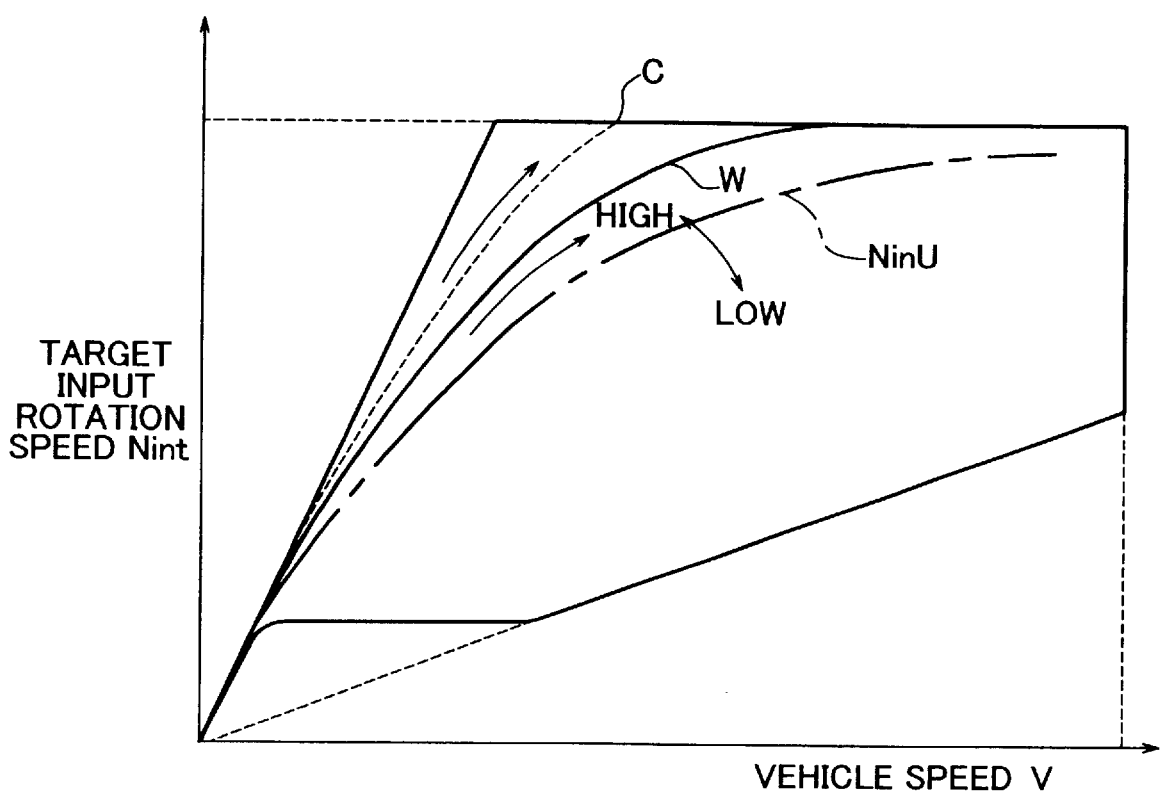
FIG. 7 is a diagram indicating an example of the setting of an upper limit value at the time of a low operating fluid temperature.

In order to prevent such overspeed operation, the speed ratio γ is controlled in accordance with a target input rotation speed that is slightly lower than the aforementioned curve W, for example, a control target upper limit value NinU indicated by a one-dot chain line in FIG. 7, at the time of full or nearly full acceleration, that is, when the accelerator pedal is operated to a completely or nearly completely depressed state, during low operating fluid temperature. In this manner, deviation from the allowable rotation speed is prevented and therefore overspeed operation is prevented even if the speed ratio-changing rate is slow and the speed ratio γ is higher than the upper limit value NinU, i.e., the control target. It is also preferable to change the upper limit value NinU depending on the operating fluid temperature. For example, when the operating fluid temperature is relatively high, the upper limit value NinU is set to a line that is close to the curve W used for the normal temperature range. If the operating fluid temperature is lower, the upper limit value NinU is set to a line that is farther apart from the curve W.

Figure 8:
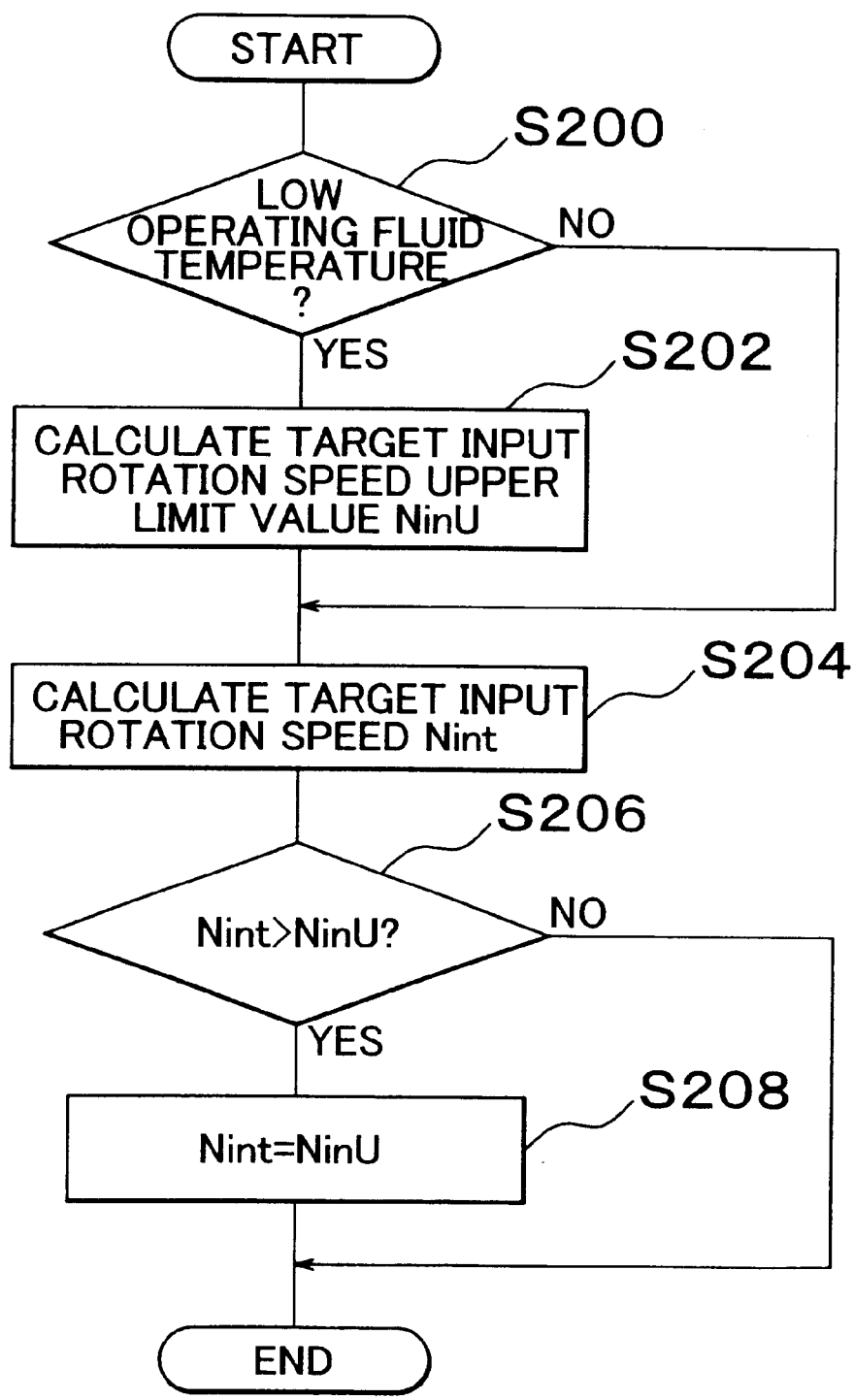
FIG. 8 is a flowchart regarding a control performed when the operating fluid temperature is low.

FIG. 8 is a flowchart regarding a control performed when the operating fluid temperature is low. The operating fluid temperature is detected based on the output of the temperature sensor 86, and it is determined whether the detected temperature is a low temperature that is below the normal temperature range (S200). If it is determined that the operating fluid temperature is a low temperature, a target input rotation speed upper limit value NinU corresponding to the low temperature state is calculated (S202). If the operating fluid temperature is within the normal range, step S202 is skipped. After that, a target input rotation speed Nint is calculated from the current state of running of the vehicle, for example, the speed shift mode, the amount of accelerator operation, the vehicle speed, etc. (S204).

Subsequently, the target input rotation speed Nint is compared with the upper limit value NinU (S206). If the target input rotation speed Nint is greater than the upper limit value NinU, the target input rotation speed Nint is reset to the upper limit value NinU (S208). Conversely, if it is determined in S206 that the target input rotation speed Nint is equal to or less than the upper limit value NinU, the control is performed based on the target input rotation speed Nint calculated in step S204.

Although in the above description, the upper limit value and the lower limit value of the target input rotation speed are used in order to reduce the changing of the speed ratio γ, it is also possible to prepare a completely separate control map for use during the low temperature state and to perform a control based on the map. This control map is a map that has a narrower region than the map for the normal temperature range, for example, a narrowed region as indicated by the one-dot chain line and the two-dot chain line in FIG. 4.

Furthermore, although in the above description, the shift control is performed based on the input rotation speed, it is also possible to perform a control based on the speed ratio γ.

Although the foregoing embodiment has a construction in which the operating fluid temperature is detected and the range of change of the target input rotation speed is changed based on the detected temperature, the embodiment is not restrictive. For example, it is also possible to adopt a construction in which the viscosity of the operating fluid is directly detected or estimated, and the range of change of the target input rotation speed is changed based on the fluid viscosity.

According to the invention, if the operating fluid temperature is low, the range of change of the target input rotation speed is set to a range that is narrower than the range of change set for the normal temperature. Therefore, even if the speed shift responsiveness deteriorates due to a low operation fluid temperature, it is possible to prevent the actual input rotation speed from deviating frond the allowable rotation speed, or the occurrence of a situation in which a required input rotation speed cannot be achieved. Therefore, it becomes possible to reduce the drivability deterioration caused by low operating fluid temperature.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. A continuously variable transmission shift control apparatus comprising:

a continuously variable transmission provided with an actuator that performs a speed shift operation by an operating fluid supplied to and discharged from the actuator; and a controller adapted to control a speed ratio of the continuously variable transmission so that a rotation speed of an input member of the continuously variable transmission reaches a target input rotation speed, the controller compares a temperature of the operating fluid with a temperature predetermined to determine whether the temperature of the operating fluid is less than a temperature range, and when it is determined that the temperature of the operating fluid is less than the predetermined temperature, the controller sets a setting range of the target input rotation speed to a second setting range that is narrower than a first setting range which is set when the temperature of the operating fluid is within the normal temperature range, and sets the target input rotation speed corresponding to a state of running of the vehicle within the second jetting range.

2. A control apparatus according to claim 1, wherein the second setting range is set to be progressively narrower with a lower operating fluid temperature.

3. A control apparatus according to claim 1, wherein when the temperature of the operating fluid is less than the predetermined temperature, the controller sets a high rotation speed-side value of the target input rotation speed to a value that is lower than a high rotation speed-side value set when the temperature of the operating fluid is at least the predetermined temperature.

4. A control apparatus according to claim 3, wherein when the temperature of the operating fluid is less than the predetermined temperature, the controller sets the high rotation speed-side value of the target input rotation speed to a value that is lower than the high rotation speed-side value set when the temperature of the operating fluid is at least the predetermined temperature, by restricting an upper limit value of the target input rotation speed calculated based on the state of running of the vehicle.

5. A control apparatus according to claim 4, wherein the upper limit value of the target input rotation speed is set to be progressively smaller with a lower temperature of the operating fluid.

6. A control apparatus according to claim 1, wherein when the temperature of the operating fluid is less than the predetermined temperature, the controller sets a low rotation speed-side value of the target input rotation speed to a value that is higher than a low rotation speed-side value set when the temperature of the operating fluid is at least the predetermined temperature.

7. A control apparatus according to claim 6, wherein when the temperature of the operating fluid is less than the predetermined temperature, the controller sets the low rotation speed-side value of the target input rotation speed to a value that is higher than the low rotation speed-side value set when the temperature of the operating fluid is at least the predetermined temperature, by restricting a lower limit value of the target input rotation speed calculated based on the state of running of the vehicle.

8. A control apparatus according to claim 7, wherein the lower limit value of the target input rotation speed is set to be progressively greater with lower values of the temperature of the operating fluid.

9. A control apparatus according to claim 1,
wherein the continuously variable transmission is provided with a manual shift mode that allows an operator to select a transmission speed from a plurality of pre-set transmission speeds that are fixed speed ratios or have predetermined widths of speed ratios, and wherein if the manual shift mode is selected and the temperature of the operating fluid is less than the predetermined temperature, the controller sets the high rotation speed-side value of the target input rotation speed alone to a value that is lower than the high rotation speed-side value set when the temperature of the operating fluid is at least the predetermined temperature.

10. A control apparatus according to claim 1, wherein when the temperature of the operating fluid is within a predetermined temperature range above a predetermined temperature, the controller sets the target input rotation speed within the first setting range.

11. A shift control method of a continuously variable transmission provided with an actuator, that performs a speed shift operation by an operating fluid being supplied to and discharged from the actuator, comprising:

comparing a temperature of the operating fluid with a temperature predetermined to determine whether a temperature of the operating fluid is less than a normal temperature;

when it is determined that the temperature of the operating fluid is less than the predetermined temperature, setting a setting range of a target input rotation speed of the continuously variable transmission to a second setting range that is narrower than a first setting range which is set when the temperature of the operating fluid is within the normal temperature range, and setting the target input rotation speed corresponding to a state of running of a vehicle within the second setting range; and controlling a speed ratio of the continuously variable transmission so that a rotation speed of an input member of the continuously variable transmission reaches the target input rotation speed.

12. A control method according to claim 11, wherein the setting step comprises:

calculating a first upper limit value on a high rotation speed side of the target input rotation speed, the first upper limit value being less than a second upper limit value on the high rotation speed side of the target input rotation speed provided for use when the temperature of the operating fluid is at least the predetermined temperature;

calculating the target input rotation speed; and setting the first upper limit value as a target input rotation speed if the target input rotation speed calculated is equal to or greater than the first upper limit value.

13. A control method according to claim 11, wherein the setting step comprises:

calculating a first lower limit value on a low rotation speed side of the target input rotation speed, the first lower limit value being greater than a second lower limit value on the low rotation speed side of the target input rotation speed provided for use when the temperature of the operating fluid is at least the predetermined temperature;

calculating the target input rotation speed; and setting the first lower limit value as a target input rotation speed if the target input rotation speed calculated is equal to or less than the first lower limit value.

* * * * *

UNITED STATES PATENT AND TRADEMARK OFFICE
CERTIFICATE OF CORRECTION

PATENT NO. : 6,602,163 B2　　　　　　　　　　　　　　　　　　　　　Page 1 of 1
DATED : August 5, 2003
INVENTOR(S) : Tamura et al.

It is certified that error appears in the above-identified patent and that said Letters Patent is hereby corrected as shown below:

<u>Title page,</u>
Item [75], the Inventors information should read:

-- [75] Inventors: Tadashi Tamura, Nishikamo-gun (JP);
　　　　　　　　　Hideki Yasue, Toyota (JP);
　　　　　　　　　Katsumi Kono, Toyota (JP);
　　　　　　　　　Daisuke Inoue, Toyota (JP);
　　　　　　　　　Yoshiaki Yamamoto, Toyota (JP);
　　　　　　　　　Hiroki Kondo, Toyota (JP);
　　　　　　　　　Hiroji Taniguchi, Okazaki (JP);
　　　　　　　　　Kenji Matsuo, Toyota (JP);
　　　　　　　　　Yuji Hattori, Bisai (JP) --

Signed and Sealed this

Tenth Day of February, 2004

JON W. DUDAS
*Acting Director of the United States Patent and Trademark Office*